United States Patent [19]

Pociask et al.

[11] Patent Number: 4,827,890

[45] Date of Patent: May 9, 1989

[54] SUPERCHARGER SYSTEM NOISE REDUCTION

[75] Inventors: Frederick Pociask; Steven W. Woodard, both of Milford, Mich.

[73] Assignee: Eaton Corporation, Cleveland, Ohio

[21] Appl. No.: 150,946

[22] Filed: Feb. 1, 1988

[51] Int. Cl.[4] ............................................. F02B 33/00
[52] U.S. Cl. ................................. 123/563; 285/114; 285/236
[58] Field of Search .................. 60/599; 123/559, 563, 123/559.1; 285/114, 231, 236, 347

[56] References Cited

U.S. PATENT DOCUMENTS 3,695,639 10/1972 Shire et al. ........................ 285/114
4,385,496 5/1983 Yamane ............................. 123/563

FOREIGN PATENT DOCUMENTS 548270 10/1942 United Kingdom ................ 123/563

Primary Examiner—Stephen F. Husar
Attorney, Agent, or Firm—P. S. Rulon

[57] ABSTRACT

Disclosed is a supercharger system (30) for an internal combustion engine (14) mounted for movement on a vehicle chassis (18). The supercharger system includes a Roots-type blower (22) fixed to the engine, an engine intake manifold (20) fixed to the engine, a chassis mounted intercooler (32), and a ducting system (34). The supercharger and intercooler and the intercooler and intake manifold each include three rigid duct members (46, 48, 50 and 54, 56, 58) connected at their interface by couplings (52, 60, 62, 64) allowing articulation therebetween. Each coupling includes telescoping ends of adjacent duct ends (46b, 50a) radially spaced apart for allowing articulation of the duct members and links 76 for limiting articulation about predetermined axes transverse to the telescoping duct ends. The radial space between the telescoping duct ends is closed by a low durometer ring seal. The totally rigid walled duct system radiates far less noise than do flexible wall ducts, the coupling allows relatively force free movement of the engine relative to intercool, thereby not interfering the vibration isolation mounts of the intercooler. And the couplings function as vibration isolators.

25 Claims, 3 Drawing Sheets

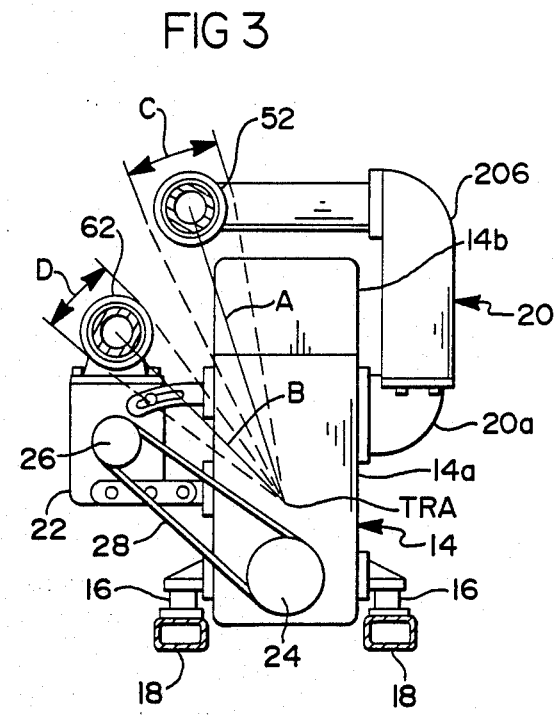
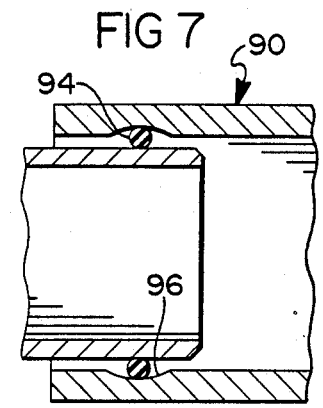
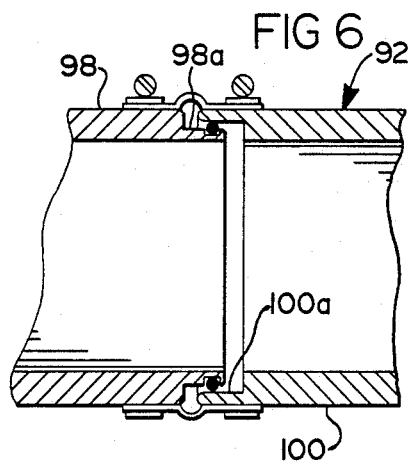
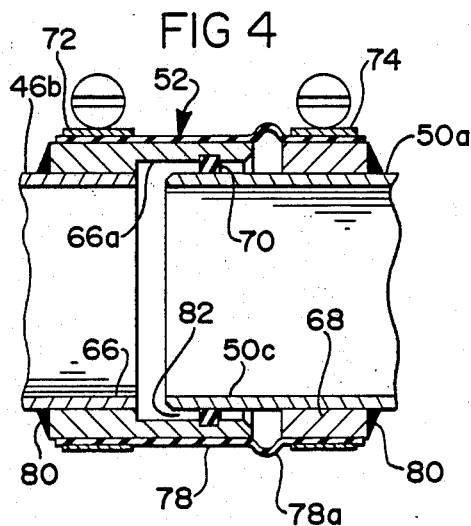
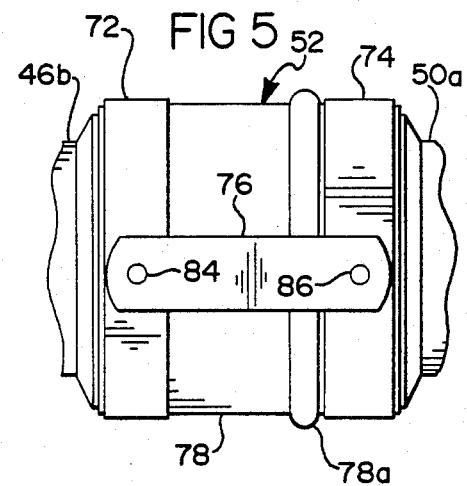

SUPERCHARGER SYSTEM NOISE REDUCTION

This application is a substitute of U.S. application Ser. No. 923,587, filed Nov. 27, 1986, now abandoned.

FIELD OF THE INVENTION

The present invention/relates to reducing noise generated by a supercharger for an internal combustion engine disposed in a vehicle. More specifically, the invention relates to reducing noise radiated by supercharger system ducting and to isolating the ducting system to prevent transmission of noise producing vibrations to vehicle chassis and body.

BACKGROUND OF THE INVENTION

Positive displacement blowers of the backflow type, such as Roots-type blowers have long been characterized by noisy operation and, therefore, have had little successful use in many applications such as engine superchargers for passenger cars and light trucks. Noise caused by such blowers may be roughly classified into two groups: solid borne noise caused by rotation of timing gears and rotor shaft bearings subjected to fluctuating loads, and fluid borne noise caused by fluid flow characteristics such as backflow or dynamic pressure pulses.

As is well known, backflow blowers are not internal compression devices, i.e., such blowers do not mechanically compress fluid while transferring the fluid from blower inlet to outlet. For example, spaces between adjacent unmeshed rotor lobes of a Roots-type blower transfers trapped volumes of relatively low pressure inlet port air to relatively high pressure air at the outlet port. Hence, the high pressure air rushes or backflows into the spaces or transfer volumes as the leading lobe of each trapped volume traverses the outlet port boundry, thereby producing dynamic pressure pulses having amplitude proportional to pressure ratio and frequency or rotor passing frequency equal to the number of rotor lobes traversing the outlet port boundries per unit time. For a two rotor Roots-type blower with three lobes per rotor, this frequency and its harmonics may be in the range of 200 to 3,000 Hz. When such a blower is operated at a pressure ratio of about 1.5, the amplitude of the outlet port pressure pulses may be in the range of two psi rms. In an analygous manner, the inlet port may also generate dynamic pressure pulses of the same frequency but with a lower amplitude in the range of 0.5 psi rms.

Pressure pulses of these frequencies and amplitudes excite supercharger system components which then act as speakers. Further, system vibrations produced by the pressure pulses are readily transmitted to vehicle chassis/body components which then also act as speakers producing objectionable noise in the vehicle passenger compartment. The problem of noise produced by the pressure pulses is particularly acute when the system includes a intercooler mounted on the chassis/body to enhance heat exchange. In such a system the supercharger may be rigidly mounted on the engine. The engine is supported on the vehicle chassis/body in known manners by shock mounts which isolate engine vibrations and allow movement of the engine relative to the chassis/body. The intercooler is soft mounted on the vehicle chassis/body to prevent or reduce vibration links between the intercooler and vehicle chassis/body. And supercharger system ducting interconnecting the engine mounted supercharger with the chassis/body mounted intercooler and the engine intake manifold with the intercooler must allow relative movement therebetween which does not adversely affect the soft mounting of the intercooler and yet be rigid enough to prevent speaker like vibration of the ducting walls.

SUMMARY OF THE INVENTION

An object of this invention is to reduce noise produced by a ducting system providing pressurized fluid between relatively moveable components.

Another object of this invention is to reduce noise generated by a supercharger system.

Another object of this invention is to reduce noise generated by pressure pulses from a supercharger of the backflow type.

Another object of this invention is to reduce noise generated by a backflow type supercharger disposed in a system having a vehicle chassis/body mounted intercooler.

According to a feature of this invention, a ducting system communicates a pressurized fluid between first and second relatively moveable components: the system includes first and second rigid duct members respectively fixed at one end to one of the components and a third rigid duct member interposed between the other ends of the first and second duct members, the other ends and the opposite ends of the third duct member telescopically receive each other with the telescoping portions of the duct walls being radially spaced apart to allow articulation of the third member relative to the first and second members in response to relative movement of the components; a flexible seal disposed in the space between the duct walls; and retaining means substantially preventing relative axial movement of the telescoping duct portions. This ducting system has several advantages over known ducting systems for communicating pressurized fluid between relatively moveable components using flexible wall ducts or rigid wall ducts interconnected by flexible wall couplings. The totally rigid wall construction resists flexing in response to pressure pulses in the pressurized fluid and therefore radiates far less noise than do flexible walled ducts or couplings. The seal and retaining means between the points of articulation function as vibration isolators, thereby reducing noise and reducing vibration transmission between the components. And, the seal/retaining means allows relatively force free relative movement of the components, thereby not interfering (side loading) with the vibration isolation mounts supporting one or both of the components.

BRIEF DESCRIPTION OF THE DRAWINGS

A ducting system according to the invention is shown in the accompanying drawings in which:

FIG. 3 is a front elevational schematic of the invention partially in section looking in the direction of arrow 3 in FIGS. 1 and 2;

FIGS. 4 and 5 are respectively a sectional view and a relief view of a duct coupling in FIGS. 1-3; and FIGS. 6 and 7 are sectional views of alternative couplings.

DETAILED DESCRIPTION OF THE DRAWINGS

Figure 1:
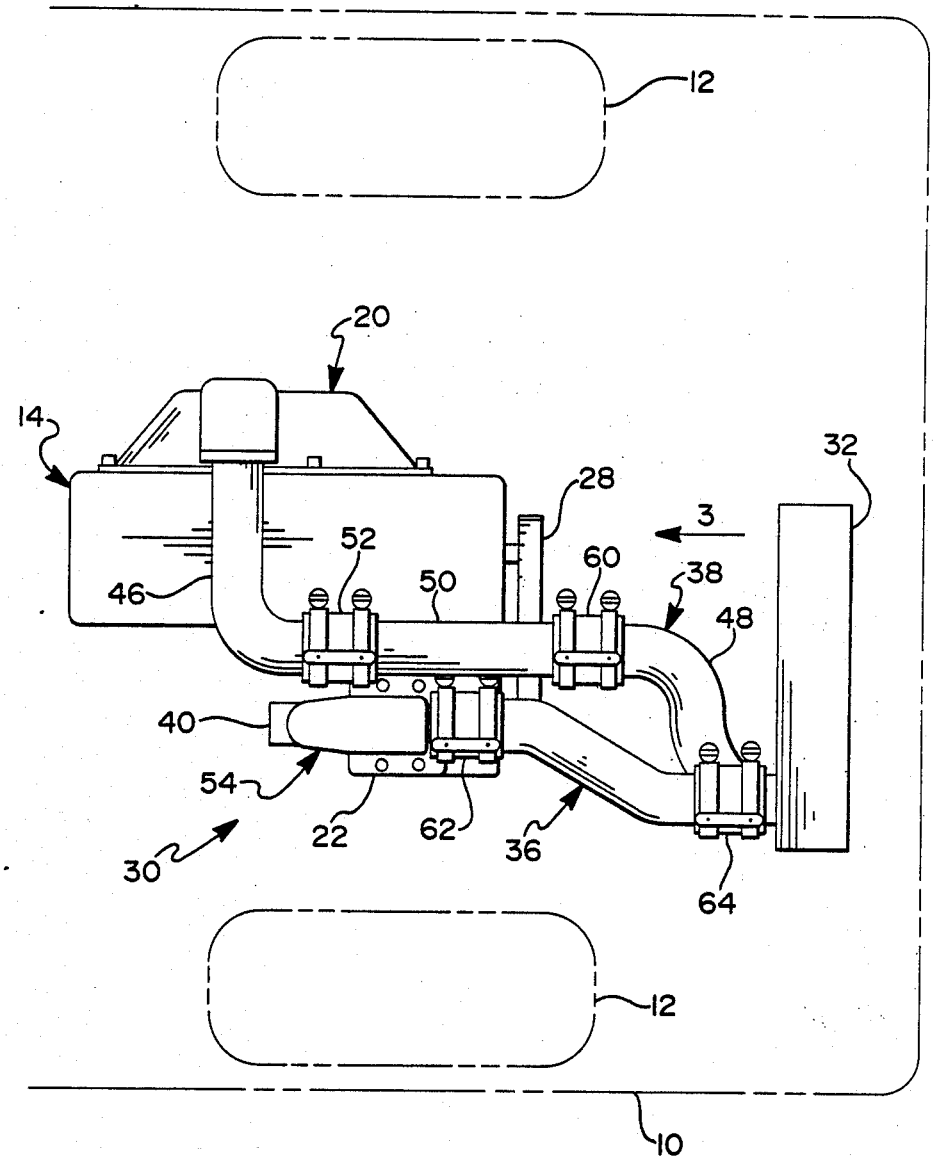
FIG. 1 is a downwardly looking schematic of the invention disposed in a partial outline of a vehicle.
Figure 2:
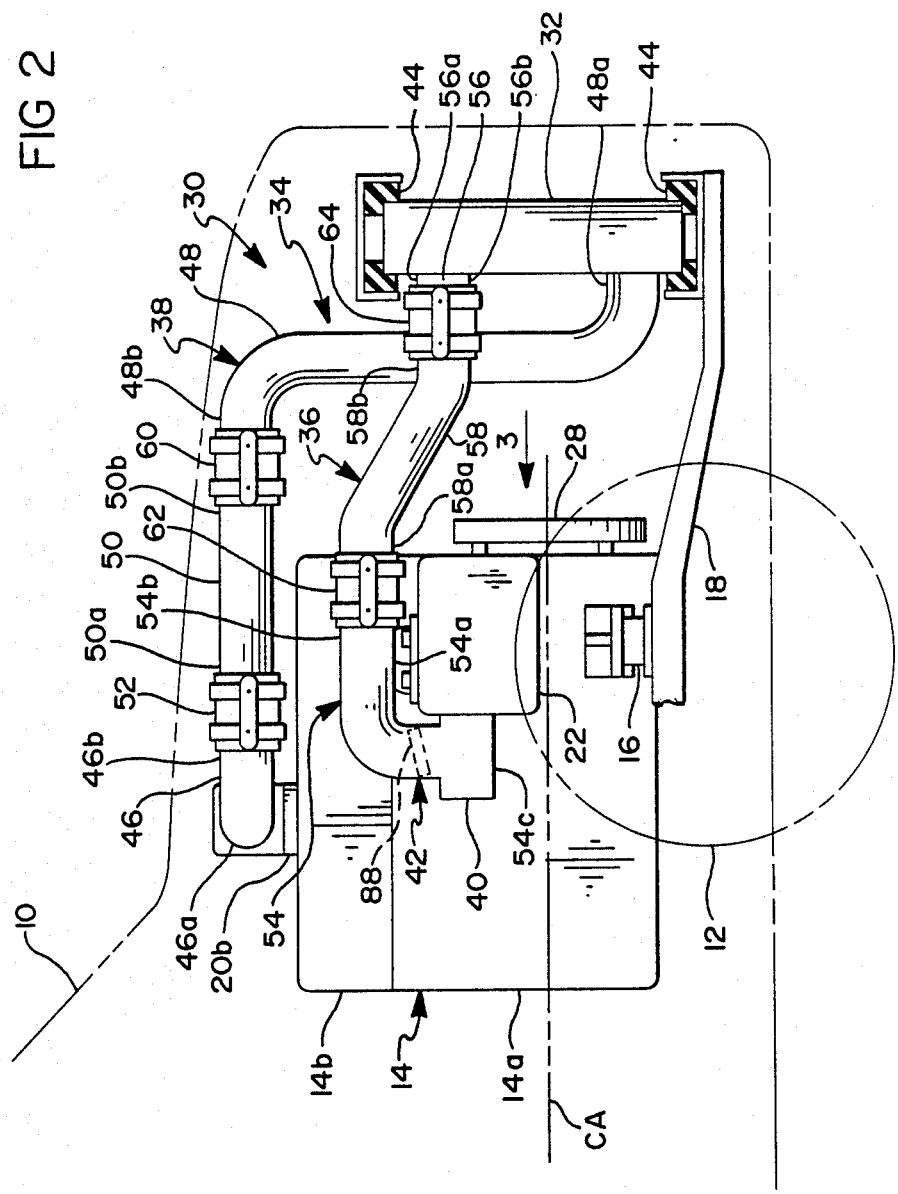
FIG. 2 is a side elevational schematic of the invention with the same type partial outline of the vehicle.

The plan and side views of FIGS. 1 and 2 illustrate a front portion of a vehicle with the vehicle body 10 and front wheels 12 represented by phantom lines. Within body 10 is an internal combustion engine 14 supported by engine mounts 16 carried on partially shown portions of a vehicle frame or chassis 18. The chassis portions are shown only in FIGS. 1 and 3. Since many vehicles are currently made with so-called unitized bodies having integrated chassis and body, the term chassis/body herein is defined as being generic to vehicles with separate chassis and body, and with integrated chassis and body. Two front engine mounts are shown. The rear or left of the engine, as viewed in FIG. 2, is also supported by a mount(s) which is often at the rear of an unshown transmission rigidly secured to the rear or left end of the engine. Engine 14 is shown as being disposed with its power shaft or crankshaft axis CA generally disposed along the longitudinal axis of the vehicle. However, the engine may be mounted with axis CA transverse to the longitudinal axis. Further, engine 14 may be of any internal combustion type.

As may be seen in FIGS. 1–3, engine 14 includes a block or housing 14a, a valve cover 14b, an intake manifold assembly 20, a supercharger 22, and a crankshaft driven pully 24. The intake manifold assembly includes a manifold member 20a fixed to the right side of the engine, as viewed in FIG. 3, and a vertically extending member 20b fixed to the top of the manifold. Manifold member 20a directs air or air fuel mixture to the engine combustion chambers in a well known manner. Vertical member 20b may be merely a duct extension of te manifold or a fuel control device. Supercharger 22 may be a positive displacement blower or a turbocharger, and may or may not be fixed directly to the engine. Preferably the supercharger is a positive displacement blower. Herein, the supercharger is a Roots-type blower which, of course, is a backflow-type blower known for producing pressure pulses. Such pressure pulses are known to generate objectional noise by resonance of flexible duct and body structures. The supercharger is fixed to the engine by brackets similar to generator mounting brackets. The unshown internal pumping mechanism of the supercharger is rotated by a pulley 26 driven by pulley 24 via a drive belt 28.

Supercharger 22 forms part of a supercharging system 30 for increasing engine power by increasing the pressure of air to the engine combustion chambers. The supercharger system includes the supercharger 22, an air to air intercooler 32, ducting system 34 having first and second duct means 36, 38 for respectively routing supercharger outlet air to the intercooler and them routing the air to the intake manifold assembly, a supercharger air intake opening 40, and a bypass assembly 42 for regulating the air pressure to the engine.

Intercooler 32 is soft mounted on the chassis/body of the vehicle by vibration isolation mounts 44 to prevent or reduce vibration links between the intercooler and chassis/body. Herein, the isolator parts of the mounts are rubber loaded in compression. Other materials may be used. Alternatively, the mounts may be loaded in shear in known manner. The intercooler for the disclosed supercharging system requires mounting soft enough to allow motion isolation of all six rigid body modes of the intercooler at less than 50 Hz to assure that all structural vibration generated in the intercooler at supercharging operating speeds is attenuated by 20 decibels from the surrounding structure, i.e., the chassis/body. The soft mounting is adversely affected should movement of duct means 36, 38 apply forces which move the intercooler in the mounts 44 far enough to restrict or prevent motion isolation. Forces as low as ten pounds (4.54 Km) have caused vibration links between the intercooler and chassis/body.

Duct system 30 allows relatively free movement of the engine about the engine's torque roll axis (TRA). The axis may translate somewhat from the point TRA in FIG. 3 during engine roll; hence, the position of the axis is only generally defined by the point TRA in FIG. 3. Further, the axis often slopes downward toward the rear of the vehicle rather than being parallel with the longitudinal axis of the vehicle as indicated in FIG. 2.

Second duct means 38 includes first and second rigid duct members 46, 48 respectively fixed at one end 46a, 48a to relatively moveable components (i.e., engine 14 and intercooler 32) and a third rigid duct member 50 interposed between the other ends 46b, 48b of the first and second duct members. The other ends 46b, 48b and the opposite ends 50a 50b of the third rigid duct member telescopically receive each other (FIGS. 4, 5) to define part of a coupling 52 which allows angular movement or articulation of the rigid duct members in response to movement of the engine. In a like manner, first duct means 36 includes fourth and fifth rigid duct members 54, 56 respectively fixed at one end 54a, 56a to supercharger 22 and intercooler 32 and a sixth rigid duct member 58 interposed between the other ends 54b, 56b of the fourth and fifth duct members. The other ends 54b, 56b and the opposite ends 58a, 58b of the six duct member telescopically receives each other in the same manner set forth above. Each of the telescoping duct wall portions form part of couplings 60, 62, 64 which are the same as coupling 52. Hence, a description of coupling 52 will suffice for all.

Coupling 52, as seen in FIGS. 4, 5, includes collars 66, 68, an extended portion 50c of duct end 50a, a ring seal 70, clamps 72, 74, two links 76 disposed on diametrically opposite sides of the coupling, and a duct cover 78. Only one link 76 is shown in the drawings and in some applications only one link is needed. Collars 66, 68 may be sealingly fixed to the duct ends in any wall known manner; herein, welds 80 are used. An enlarged portion 66a of the inner wall of collar 68 telescopically extends over wall portion 50c of duct 50 with an annular, radially extending space 82 therebetween to allow angular movement or articulation of the rigid wall duct members. Space 82 is sealed against leakage of supercharged air in the ducts by ring seal 70 retained in an annular groove in collar 66. Duct wall portion may also be provided with an annular groove. Seal 70, disclosed herein, is made of an elastomeric material of relatively low durometer. The seal must be elastic enough to allow relatively force free angular movement or articulation of the rigid duct members while still maintaining acceptable sealing of space 82. Seal 70 is also, preferably elastic enough to function as a vibration isolator. Dust cover 78, which may be held in place by clamps 72, 74, prevents entrance of foreign matter which could deteriorate seal 70. The cover should be elastic enough so as not to hinder force free articulation of the rigid ducts. Herein the cover is a rubber sleeve with a convolute 78a to enhance flexibility.

Links 76 connects clamps 72, 74 by pivot pins 84, 86. The links are preferably made of a thin metal to reduce vibration transmission. Vibration transmitted by the links is greatly reduced by dust cover 78. When the clamps are tightly secured over collars 66, 68, links 76 prevent axial movement of the duct members and function as hinges which pivot about pins 84, 86 to limit angular movement or articulation of the rigid ducts in a predetermined direction transverse to the longitudinal areas of the telescoping duct wall portions 50c, 66a.

FIG. 3 illustrates a method of readily determining the pivotal axes of the pins 84, 86 by positioning the pin axes along diameters of the telescoping duct walls. The diameters should lie along a ray extending from the engine torque roll axis TRA. Arrows A, B represent the rays for couplings 52, 62 and, accordingly, the transverse hinge axes. Further, forces tending to axially move the ducts may be minimized by positioning the seal 70 midway between pivot pins 84, 86 and by positioning the longitudinal axis of the telescoping duct portions substantially parallel to axis TRA. Alternatively, the longitudinal axis of the telescoping duct portions may be positioned substantially parallel or in axial alignment with the ray extending from axis TRA. This alternative arrangement is particularly advantageous in a vehicle with transverse engine and with intercooler 32 positioned in the front of the vehicle, as shown herein. Arrows C, D in FIG. 3 represent measured movement of rigid ducts 46, 54 at couplings 52, 62 relative to the chassis/body and intercooler when engine 14 is torqued with the unshown transmission shifted between forward and reverse drive. Arrow C represents a total movement of three inches (7.62 cm). As may be seen, total movement at the coupling increases with increasing distance from axis TRA.

The rigid duct members are preferably formed of steel or aluminum. Excellent results have been obtained with one eight (0.32 cm) thick walls of extruded aluminum. Walls of cast aluminum are believed ideal due to the inherent damping characteristics of cast material.

Rigid duct member 54 defines a unitary duct for supercharger outlet and inlet air, and bypass air. Outlet air is discharged at the top of the supercharger into duct portion 54a, inlet and bypass air is directed to the supercharger inlet at the leftwardly facing end of the supercharger in FIGS. 1, 2 by duct portion 54c. Bypass air is controlled by a butterfly valve 88 in bypass assembly 42. Bypass assemblies of this type are well known in the art and the valves therein are opened and closed as a function of engine power demand in known manners.

FIGS. 6 and 7 represent alternative coupling embodiments 90, 92 of coupling 52. FIG. 6 illustrates only the telescoping and seal portion of the coupling. Therein, a ring seal, 94 analogous to seal 70, is disposed in an enlarged, radioed groove to enhance force free articulation. In practice, coupling 90 is provided with means to prevent axial movement and define the transverse axis of articulation in a manner analogous to coupling 52. FIG. 7 illustrates a simplified version of coupling 52 wherein telescoping of the wall portions is provided by reducing the outer wall diameter 98a of one duct 98 and increasing the inner wall diameter 100a of the other duct 100.

Three embodiments of the invention have been disclosed for illustration purposes. Many variations and modifications of the disclosed embodiments are believed to be within the spirit of the invention. The following claims are intended to cover the inventive portions of the invention and variations and modifications within the spirit of the disclosed invention.

What is claimed is:

1. A vehicle including:
   a chassis/body;
   an internal combustion engine having an air intake manifold fixed thereto;
   engine mounts supporting the engine on the chassis/body and allowing movement of the engine relative the chassis/body within first limits;
   an engine driven supercharger having an air inlet and an air outlet;
   an air intercooler for cooling the supercharger outlet air;
   vibration isolator mounts supporting the intercooler on the chassis/body and allowing movement of the intercooler relative to the chassis/body within second limits less than the first limits;
   a ducting system including first and second duct means for respectively routing the supercharger outlet air to the intercooler and then routing the air to the intake manifold, the second duct means including first and second rigid duct members respectively fixed at one end portion thereof to the manifold and intercooler and a third rigid duct member interposed between the other end portions of the first and second duct members, and other end portions and opposite end portions of the third duct member telescopically receiving each other with the telescoping end portions of the duct walls being radially spaced apart to allow relative angular movement therebetween in response to movement of the engine;
   a flexible seal disposed in each radial space between the duct walls; and
   retaining means substantially preventing relative axial movement of the telescoping duct portions and allowing said relative angular movement of the telescoping duct portions, whereby movement of the intercooler in its vibration isolator mounts due to engine movement is minimized.

2. The vehicle of claim 1, where said retaining means includes hinge means allowing said relative angular movement about axes disposed in a predetermined transverse direction relative to the longitudinal axes of the telescoping duct portions.

3. The vehicle of claim 2, wherein said retaining means includes a link extending generally in the longitudinal direction of the telescoping duct portions and pivotally secured at longitudinally apart positions to each of the ducts for preventing said relative axial movement and for allowing said angular movement in said predetermined transverse direction.

4. The vehicle of claim 3, wherein said retaining means includes a second link secured in the same manner and disposed diametrically across from the first mentioned link.

5. The vehicle of claim 1, wherein said seal is an elastomeric ring seal having a relatively low durometer providing vibration isolation between the telescoping duct members.

6. The vehicle of claim 1, further including a dust cover disposed over the outer exposed end of the telescoping duct portions and positioned not to interfere with said angular movement.

7. The vehicle of claim 1, wherein said retaining means includes first and second clamps axially spaced apart with respect to the longitudinal axes of the telescoping ducts and respectively secured to the outer surface of telescoping duct portions, and a generally longitudinally disposed link pivotally secured at its ends to said clamps for preventing said relative axial movement and for allowing said angular movement about axes disposed in a predetermined transverse direction relative to the longitudinal axes of the telescoping duct portions.

8. The vehicle of claim 7, wherein said retaining means includes a second link secured in the same manner to said clamps and disposed diametrically across from the first mentioned link.

9. The vehicle of claim 7, wherein said seal is an elastomeric ring seal having a relatively low durometer providing vibration isolation between the telescoping duct members and said link being positioned to minimize vibration transmission between said telescoping duct members.

10. The vehicle of claim 1, wherein said supercharger is fixed to said engine;
    said first duct means of said ducting system includes fourth, fifth, and sixth duct members with end portions respectively the same as said first, second, and third duct members; and
    the telescoping end portions of said fourth, fifth, and sixth duct members cooperating with seals and retainers substantially the same as said flexible seals and retaining means.

11. The vehicle of claim 10, wherein said supercharger is of the backflow type.

12. The vehicle of claim 10, wherein said supercharger is of the Roots type.

13. The vehicle of claim 1, wherein said engine mounts generally define a torque roll axis for the engine with the magnitude of the engine roll being within said first limits and proportional to the magnitude of engine torque;
    said other end of the first rigid duct being radially spaced from the torque roll axis; and
    the longitudinal axes of said telescoping duct portions being positioned substantially parallel to the torque roll axis to minimize axial movement of the telescoping duct portions in response to engine roll.

14. The vehicle of claim 1, wherein said engine mounts generally define a torque roll axis for the engine with the magnitude of engine roll being within said first limits and proportional to the magnitude of engine torque;
    said other end of the first rigid duct being radially spaced from the torque roll axis; and
    the longitudinal axes of said telescoping duct portions being positioned substantially parallel to radii extending from the torque roll axis to minimize axial movement of the telescoping duct portions in response to engine roll.

15. A ducting system for communicating pressurized fluid from a supercharger to an intercooler and from the intercooler to an internal combustion engine, the supercharger mounted on the engine and the engine supported on a relatively rigid platform by engine mounts allowing movement of the engine relative to the platform within first limits, the intercooler supported on the platform by vibration isolator mounts allowing movement of the intercooler relative to the platform within limits less than the first limits; the system comprising:
    first duct means including first and second rigid duct members respectively fixed at one end portion thereof to the supercharged and the intercooler, a third rigid duct member interposed between the other end portions of the first and second duct members, the other end portions and opposite end portions of the third duct member telescopically receiving each other with the telescoping end portions of the duct walls being radially spaced apart to allow articulation of the third member relative to the first and second members in response to relative movement of the supercharger and intercooler;
    second duct means including fourth and fifth rigid duct members respectively fixed at one end portion thereof to the intercooler and engine, a sixth rigid duct member interposed between the other end portions of the fourth and fifth duct members, the other end portions and opposite end portions of the third duct member telescopically receiving each other with the telescoping end portions of the duct walls being radially spaced apart to allow articulation of the sixth member relive to the fourth and fifth members in response to relative movement of the engine and intercooler;
    a flexible seal disposed in the radial space between the duct walls; and
    retaining means substantially preventing relative axial movement of the telescoping duct portions and allowing said articulation.

16. The ducting system of claim 15, where said retaining means includes hinge means allowing said articulation about axes disposed in a predetermined transverse direction relative to the longitudinal axes of the telescoping duct portions.

17. The ducting system of claim 16, wherein said retaining means includes a link extending in the longitudinal direction of the telescoping duct portions and pivotally secured at longitudinally spaced apart positions to each of the ducts for preventing said relative axial movement and for allowing said articulation in said predetermined transverse direction.

18. The ducting system of claim 17, wherein said retaining means includes a second link secured in the same manner and disposed diametrically across from the first mentioned link.

19. The ducting system of claim 15, wherein said seal is an elastomeric ring seal having a relatively low durometer providing vibration isolation between the telescoping duct members.

20. The ducting system of claim 15, wherein said supercharger is of the backflow type.

21. The ducting system of claim 15, wherein said supercharger is of the Roots type.

22. The ducting system of claim 15 wherein said engine mounts generally define a torque roll axis for the engine with the magnitude of the engine roll being within said first limits and proportional to the magnitude of engine torque;
    said other end portion of the first rigid duct being radially spaced from the torque roll axis; and
    the longitudinal axes of said telescoping end portions being positioned substantially parallel to the torque roll axis to minimize axial movement of the telescoping end portions in response to engine roll.

23. The ducting system of claim 15, wherein said engine mounts generally define a torque roll axis for the engine with the magnitude of engine roll being within said first limits and proportional to the magnitude of engine torque;
    said other end portion of the first rigid duct being radially spaced from the torque roll axis; and the longitudinal axes of said telescoping end portions being positioned substantially parallel to radii extending from the torque roll axis to minimize axial movement of the telescoping end portions in response to engine roll.

24. A ducting system for communicating a pressurized fluid between first and second relatively movable components, the first component including an internal combustion engine supported on a platform by engine mounts allowing movement of the engine relative to platform within first limits, the system including:

first and second rigid duct members respectively fixed at one end portion thereof to one of the components and a third rigid duct member interposed between the other end portions of the first and second duct members, the other end portions and opposite end portions of the third duct member telescopically receiving each other with the telescoping end portions of the duct walls being radially spaced apart to allow articulation of the third member relative to the first and second members in response to relative movement of the components;

a flexible seal disposed in the radial space between the duct walls;

retaining means substantially preventing relative axial movement of the telescoping duct portions and allowing said articulation;

said engine mounts generally define a torque roll axis for the engine with the magnitude of the engine roll being within said first limits and proportional to the magnitude of engine torque;

said other end of the first rigid duct being radially spaced from the torque roll axis; and the longitudinal axes of said telescoping end portions being positioned substantially parallel to the torque roll axis to minimize axial movement of the telescoping end portions in response to engine roll.

25. A ducting system for communicating a pressurized fluid between first and second relatively movable components, the first component including an internal combustion engine supported on a platform by engine mounts allowing movement of the engine relative to the platform within first limits, the system including:

first and second rigid duct members respectively fixed at one end portion thereof to one of the components and a third rigid duct member interposed between the other end portions of the first and second duct members, the other end portions and opposite end portions of the third duct member telescopically receiving each other with the telescoping end portions of the duct walls being radially spaced apart to allow articulation of the third member relative to the first and second members in response to relative movement of the components;

a flexible seal disposed in the radial space between the duct walls;

retaining means substantially preventing relative axial movement of the telescoping duct portions and allowing said articulation;

said engine mounts generally define a torque roll axis for the engine with the magnitude of engine roll being within said first limits and proportional to the magnitude of engine torque;

said other end of the first rigid duct being radially spaced from the torque roll axis; and the longitudinal axes of said telescoping end portions being positioned substantially parallel to radii extending from the torque roll axis to minimize axial movement of the telescoping end portions in response to engine roll.

* * * * *